United States Patent
Redpath

(10) Patent No.: US 8,527,495 B2
(45) Date of Patent: Sep. 3, 2013

(54) PLUG-IN PARSERS FOR CONFIGURING SEARCH ENGINE CRAWLER

(75) Inventor: Richard J. Redpath, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2874 days.

(21) Appl. No.: 10/078,784

(22) Filed: Feb. 19, 2002

(65) Prior Publication Data
US 2003/0158835 A1  Aug. 21, 2003

(51) Int. Cl.
*G06F 17/30* (2006.01)

(52) U.S. Cl.
CPC ..................... *G06F 17/30* (2013.01)
USPC ............ 707/709; 707/710; 707/706; 707/748

(58) Field of Classification Search
USPC ............ 707/1–10, 100–104.1, 200, 709–710, 707/706, 748; 709/203–226; 705/26–27, 705/1–2, 10; 715/512–513; 713/200–201; 706/45–50
See application file for complete search history.

(56) References Cited

U.S. PATENT DOCUMENTS

| | | | | |
|---|---|---|---|---|
| 5,530,852 | A | 6/1996 | Meske, Jr. et al. | 395/600 |
| 5,784,608 | A | 7/1998 | Meske, Jr. et al. | 395/602 |
| 5,855,020 | A * | 12/1998 | Kirsch | 707/10 |
| 5,903,892 | A | 5/1999 | Hoffert et al. | 707/10 |
| 5,913,215 | A | 6/1999 | Rubinstein et al. | 707/10 |
| 5,920,859 | A | 7/1999 | Li | 707/5 |
| 5,953,732 | A | 9/1999 | Meske, Jr. et al. | 707/513 |
| 5,963,950 | A | 10/1999 | Nielsen et al. | 707/102 |
| 5,987,482 | A | 11/1999 | Bates et al. | 707/513 |
| 5,999,929 | A | 12/1999 | Goodman | 707/7 |
| 6,012,083 | A | 1/2000 | Savitzky et al. | 709/202 |
| 6,151,624 | A * | 11/2000 | Teare et al. | 709/217 |
| 6,199,081 | B1 * | 3/2001 | Meyerzon et al. | 715/513 |
| 6,271,840 | B1 * | 8/2001 | Finseth et al. | 715/513 |
| 6,289,342 | B1 * | 9/2001 | Lawrence et al. | 707/7 |
| 6,351,755 | B1 * | 2/2002 | Najork et al. | 715/501.1 |
| 6,438,539 | B1 * | 8/2002 | Korolev et al. | 707/3 |
| 6,510,406 | B1 * | 1/2003 | Marchisio | 704/9 |
| 6,547,829 | B1 * | 4/2003 | Meyerzon et al. | 715/501.1 |
| 6,584,468 | B1 * | 6/2003 | Gabriel et al. | 707/10 |

(Continued)

FOREIGN PATENT DOCUMENTS

| | | | |
|---|---|---|---|
| EP | 1519281 A2 * | 3/2005 | |
| WO | WO 98/56159 | * 12/1998 | |
| WO | WO 99/59087 | * 11/1999 | 17/30 |

OTHER PUBLICATIONS

Gautam Pant et al. MySpiders:Evolve your own intelligent web crawlers, autonomous agenets and multi-agents systems, 5, 22 229, 2002.*

(Continued)

*Primary Examiner* — Srirama Channavajjala
(74) *Attorney, Agent, or Firm* — Steven M. Greenberg, Esq.; Carey, Rodriguez, Greenberg & O'Keefe

(57) ABSTRACT

A plug-in interface is provided in a crawling search engine. Plug-in parsers are also provided for use with the search engine. The plug-in interface allows the search engine to be configured with different plug-in parsers. Thus, a customer may configure a search engine with a parser that best suits the needs of the customer and to try new parsing algorithms to find the best results.

18 Claims, 4 Drawing Sheets

(56) References Cited

U.S. PATENT DOCUMENTS

| | | |
|---|---|---|
| 6,584,569 B2 * | 6/2003 | Reshef et al. ............... 713/201 |
| 6,631,369 B1 * | 10/2003 | Meyerzon et al. ............... 707/4 |
| 6,638,314 B1 * | 10/2003 | Meyerzon et al. ............... 715/513 |
| 6,665,658 B1 * | 12/2003 | DaCosta et al. ............... 707/3 |
| 6,714,934 B1 * | 3/2004 | Fordham ............... 707/100 |
| 6,725,214 B2 * | 4/2004 | Garcia-Chiesa ............... 707/3 |
| 6,741,959 B1 * | 5/2004 | Kaiser ............... 704/7 |
| 6,751,612 B1 * | 6/2004 | Schuetze et al. ............... 707/4 |
| 6,920,448 B2 * | 7/2005 | Kincaid et al. ............... 707/3 |
| 7,519,902 B1 * | 4/2009 | Kraft et al. ............... 715/234 |
| 7,698,303 B2 * | 4/2010 | Goodwin et al. ............... 707/603 |
| 2001/0037359 A1 * | 11/2001 | Mockett et al. ............... 709/203 |
| 2002/0010714 A1 * | 1/2002 | Hetherington ............... 707/505 |
| 2002/0042789 A1 * | 4/2002 | Michalewicz et al. ............... 707/3 |
| 2002/0046259 A1 * | 4/2002 | Glorikian ............... 709/218 |
| 2002/0078136 A1 * | 6/2002 | Brodsky et al. ............... 709/203 |
| 2002/0099697 A1 * | 7/2002 | Jensen-Grey ............... 707/3 |
| 2002/0103368 A1 * | 8/2002 | Harding et al. ............... 536/96 |
| 2002/0103920 A1 * | 8/2002 | Berkun et al. ............... 709/231 |
| 2002/0129014 A1 * | 9/2002 | Kim et al. ............... 707/5 |
| 2002/0143932 A1 * | 10/2002 | Quintero et al. ............... 709/224 |
| 2002/0147880 A1 * | 10/2002 | Wang Baldonado ............... 711/1 |
| 2002/0194161 A1 * | 12/2002 | McNamee et al. ............... 707/2 |
| 2002/0194306 A1 * | 12/2002 | Tilt et al. ............... 709/219 |
| 2003/0055816 A1 * | 3/2003 | Paine et al. ............... 707/3 |
| 2003/0115189 A1 * | 6/2003 | Srinivasa et al. ............... 707/3 |
| 2004/0015775 A1 * | 1/2004 | Simske et al. ............... 715/500 |
| 2004/0031024 A1 * | 2/2004 | Fairweather ............... 717/143 |
| 2004/0128285 A1 * | 7/2004 | Green et al. ............... 707/3 |
| 2004/0143787 A1 * | 7/2004 | Grancharov et al. ............... 715/501.1 |
| 2004/0208482 A1 * | 10/2004 | Suga et al. ............... 386/95 |
| 2005/0004889 A1 * | 1/2005 | Bailey et al. ............... 707/1 |
| 2007/0005586 A1 * | 1/2007 | Shaefer et al. ............... 707/5 |

OTHER PUBLICATIONS

Jiang Chen et al. Parallel web text mining for cross-language IR, 16 pages, 2000.*

Soumen Chakrabarti et al. Focused crawling: a new approach to topic-specific web resource discovery published by Elsevier science BV, 1999 pp. 545-562.*

Boon Thau Loo et al. distributed web crawling over DHTs, no date, pp. 1-11.*

Mrugank Surve et al. "agroexplorer: a meaning based multilingual search engine", media lab asia, IIT Bombay, no publishing date, 13 pages.*

Fillippo Menczer et al. "evaluating topic driven web crawlers", SIGIR '01, Sep. 2001, 9 pages.*

Sonera Plaza ltd, medialab "multimedia search engines white paper", Jan. 4, 2002 pp. 1-10.*

Joachim Hammer et al. "using mobile crawlers to search the web efficiently", international journal of computer and information science, 2000, pp. 1-23.*

Steve Waterhouse et al. "distributed search in peer-to-peer networks", IEEE internet computing, Jan.*Feb. 2002, pp. 1-6.*

Yamada, T, "LR-parser-driven Viterbi search with hypotheses merging mechanism using context-dependent phone models",Spoken Language, 1996. ICSLP 96. Proceedings., Fourth International Conference, vol. 4, Oct. 1996, pp. 2103-2106.*

Suman Saha et al. "Rough set based ensemble prediction for topic specific web crawling", IEEE 2009 Seventh International Conference on Advances in Pattern Recognition, pp. 153-156.*

IBM Research Disclosure 422128, "Link-Driven Annotation of HTML Pages", Jun. 1999, p. 893.

IBM Technical Disclosure Bulletin vol. 41, No. 01, "Information Retrieval and Presentation Apparatus with Version Control", Jan. 1998, pp. 711-712.

* cited by examiner

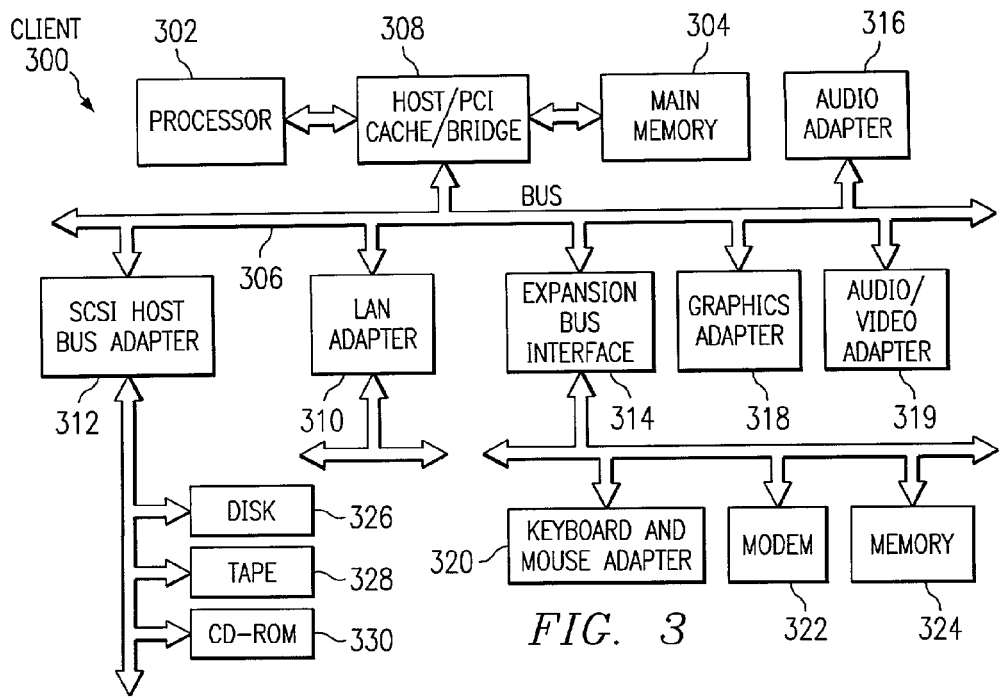

FIG. 3

```
<HTML>
<HEAD><TITLE>NewCity Satellite Television Services</TITLE><HEAD>
<BODY>
<CENTER><H1>NewCity Satellite Television Services, Inc.</H1></CENTER>
<BR>
<P>The Leader in Satellite Television Programming for over <B>5 years</B> has
now increased the <A HREF="page00010021.html">benefits</A> of owning a
satellite television system by providing <B>free</B> local channels and a free
subscriber recording system for all new subscribers.</P>
<BR>
<P>Have you always wanted to pause live television broadcasts?  Now you can with
our <A HREF="page00010022.html">subscriber recording system</A>. </P>
<BR>
<P>Subscribe today to our <A HREF="page00010023.html">Gold Package</A>
for one year and you will receive a <|>free</|> satellite system including two
receivers, <|>free</|> installation, and our <|>free</|> subscriber recording system.
You get all of this for only $49.95 per month with only a one year commitment
required.</P>
<BR>
<P>Its never been a better time to see all the benefits of receiving clear, crisp digital
television signals through a NewCity Satellite Television system.  And for only $49.95
a month, you pay less than you currently pay for cable television.  <B>Sign up
today!!</B></P>
</BODY>
</HTML>
```

| | |
|---|---|
| 502 | years has now increased the <A HREF="page00010021.html">benefits</A> of owning a satellite television |
| 504 | Now you can with our <A HREF="page00010022.html">subscriber recording system</A>. Subscribe today |
| 506 | system. Subscribe today to our <A HREF="page00010023.html">Gold Package</A> for one year and you |

FIG. 5B

| | |
|---|---|
| 552 | Television Programming for over 5 years has now increased the <A HREF="page00010021.html">benefits</A> of owning a satellite television system by providing free local |
| 554 | Now you can with our <A HREF="page00010022.html">subscriber recording system</A> |
| 556 | Subscribe today to our <A HREF="page00010023.html">Gold Package</A> for one year and you will receive a free satellite |

PLUG-IN PARSERS FOR CONFIGURING SEARCH ENGINE CRAWLER

FIELD OF THE INVENTION

The present invention relates to data processing and, in particular, to crawling search engines. Still more particularly, the present invention provides a method, apparatus, and program for providing plug-in parsers for configuring a search engine crawler.

BACKGROUND OF THE INVENTION

The worldwide network of computers commonly known as the "Internet" has seen explosive growth in the last several years. Mainly, this growth has been fueled by the introduction and widespread use of so-called "web browsers," which enable simple graphical user interface-based access to network servers, which support documents formatted as so-called "web pages." These web pages are versatile and customized by authors. For example, web pages may mix text and graphic images. A web page also may include fonts of varying sizes.

A browser is a program that is executed on a graphical user interface (GUI). The browser allows a user to seamlessly load documents from the Internet and display them by means of the GUI. These documents are commonly formatted using markup language protocols, such as hypertext markup language (HTML). Portions of text and images within a document are delimited by indicators, which affect the format for display. In HTML documents, the indicators are referred to as tags. The browser gives some means of viewing the contents of web pages (or nodes) and of navigating from one web page to another.

A search engine is software that searches for data based on search criteria. Search engines have been brought to the forefront since the World Wide Web has become more widely used. Search engines can differ dramatically in the way they find and index the material on the Web, and the way they search the indexes from a search query.

A crawler is a search engine that locates new documents and new sites by following hypertext links from server to server and indexing information based on search criteria. A crawler initially obtains a list of uniform resource locators (URL) for which page data is obtained. The page data is parsed for hypertext anchors in the page. A hypertext anchor is a type of code used to define a hypertext link to another page or to a location elsewhere in the page. A crawler may also associate surrounding text with the anchor to form a "window chunk." These window chunks are analyzed and recursively crawled. Weights may be kept about the edges of this crawling and, as a result, a best list is found.

The parsing algorithm for finding window chunks is fixed within the search engine code. For example, the parsing algorithm may define a window chunk as the anchor, ten words before the anchor, and ten words after the anchor. Results of a crawling search engine may change drastically if the parsing algorithm is modified. However, the search engine code itself must be changed to modify the parsing algorithm.

Therefore, it would be advantageous to provide an improved search engine for which the parsing algorithm is more easily modifiable.

SUMMARY OF THE INVENTION

The present invention provides a plug-in interface to a crawling search engine. Plug-in parsers are also provided for use with the search engine. The plug-in interface allows the search engine to be configured with different plug-in parsers. Thus, a customer may configure a search engine with a parser that best suits the needs of the customer and to try new parsing algorithms to find the best results.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is an example of page data in accordance with a preferred embodiment of the present invention;

FIGS. 5A and 5B are example window chunks in accordance with a preferred embodiment of the present invention;

DETAILED DESCRIPTION OF THE PREFERRED EMBODIMENT

Figure 1:
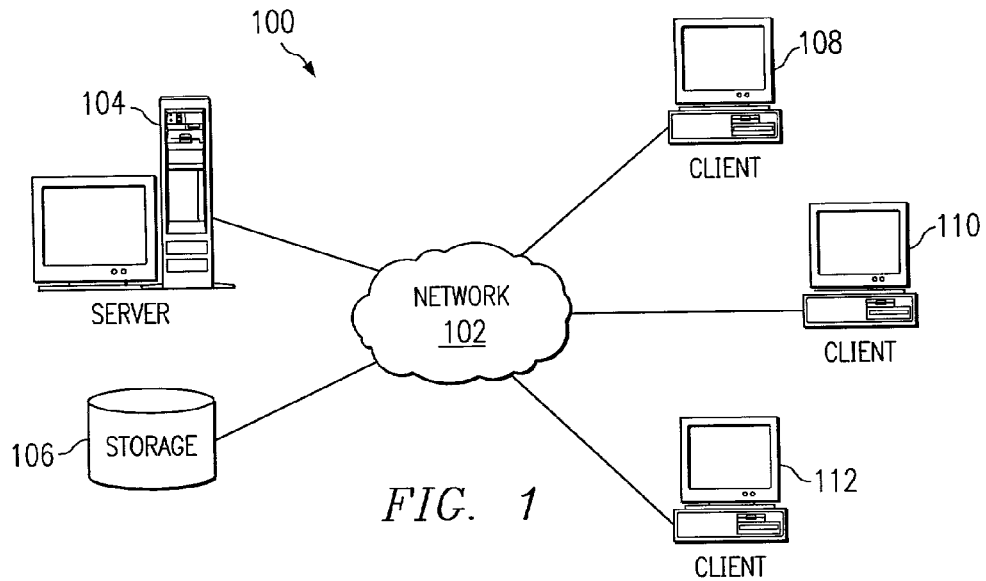
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
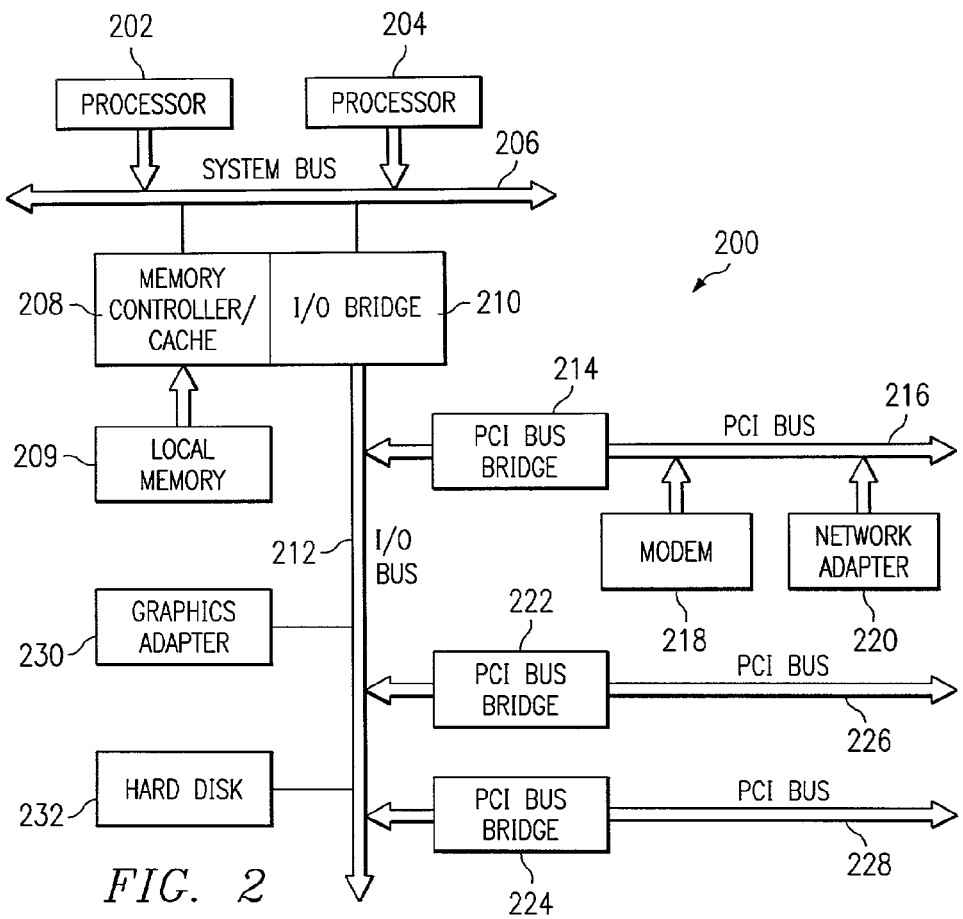
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Returning to FIG. 1, server 104 may execute a crawling search engine. The search engine obtains a list of URLs and page data is obtained from the same server or other servers (not shown). A parser in the search engine parses the page data for hypertext anchors in the page. The crawling search engine also associates surrounding text with the anchor to form a "window chunk." These window chunks are analyzed and recursively crawled. Weights may be kept about the edges of this crawling and, as a result, a best list is found.

An example of page data is shown in FIG. 4 in accordance with a preferred embodiment of the present invention. This example page includes three anchors: "<A HREF="page00010021.html">benefits</A>", "<A HREF="page00010022.html">subscriber recording system</A>", and "<A HREF="page00010023.html">Gold Package</A>". The parser associates surrounding text with the anchors to form window chunks.

Example window chunks are shown in FIGS. 5A and 5B in accordance with a preferred embodiment of the present invention. In the example shown in FIG. 5A, each of window chunks 502, 504, 506 include an anchor, five words before the anchor, and five words after the anchor. Non-anchor HTML tags, such as text formatting tags, may be removed.

FIG. 5B illustrates another example of window chunks formed from the page shown in FIG. 4. In this example, window chunks 552, 554, 556 are formed by including an anchor, up to ten words before the anchor, and up to ten words after the anchor without crossing sentence boundaries. Sentence boundaries may be delineated by, for example, periods and/or paragraph tags.

In accordance with a preferred embodiment of the present invention, the crawling search engine includes a plug-in interface. Plug-in parsers are also provided for use with the search engine. The plug-in interface allows the search engine to be configured with different plug-in parsers. Thus, a customer may configure a search engine with a parser that best suits the needs of the customer and to try new parsing algorithms to find the best results.

Figure 6:
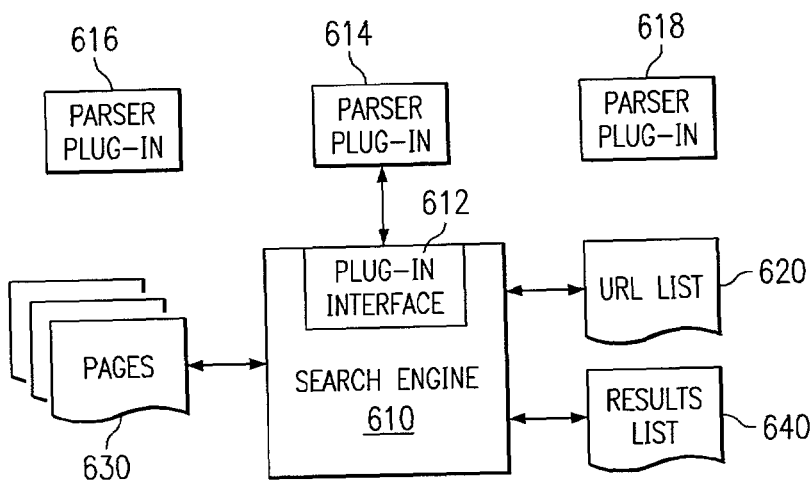
FIG. 6 is a block diagram illustrating a crawling search engine in accordance with a preferred embodiment of the present invention.

With reference now to FIG. 6, a block diagram illustrating a crawling search engine is shown in accordance with a preferred embodiment of the present invention. Search engine 610 obtains a list of URLs 620 and page data 630 is obtained from servers. The page data is parsed for hypertext anchors. The crawling search engine also associates surrounding text with the anchor to form a "window chunk." These window chunks are analyzed and recursively crawled. Weights may be kept about the edges of this crawling and results list 640 is found.

Search engine 610 includes plug-in interface 612. Plug-in parsers 614, 616, 618 are also provided for use with the search engine. Thus, plug-in parser 614 may be loaded to obtain the best results for the needs of the customer. Also, a customer may try plug-in parser 616 and plug-in parser 618 to determine which has the best results for the particular application of the search engine.

The search engine may have a general weighting algorithm with which all parsers must comply. However, plug-in parsers may also include a weighting algorithm. Thus, plug-in parsers may be developed to implement a particular weighting algorithm for use with the specific parsing algorithm. Therefore, plug-in parsers may be used to define a window chunk, include a weighting algorithm, or both.

Figure 7:
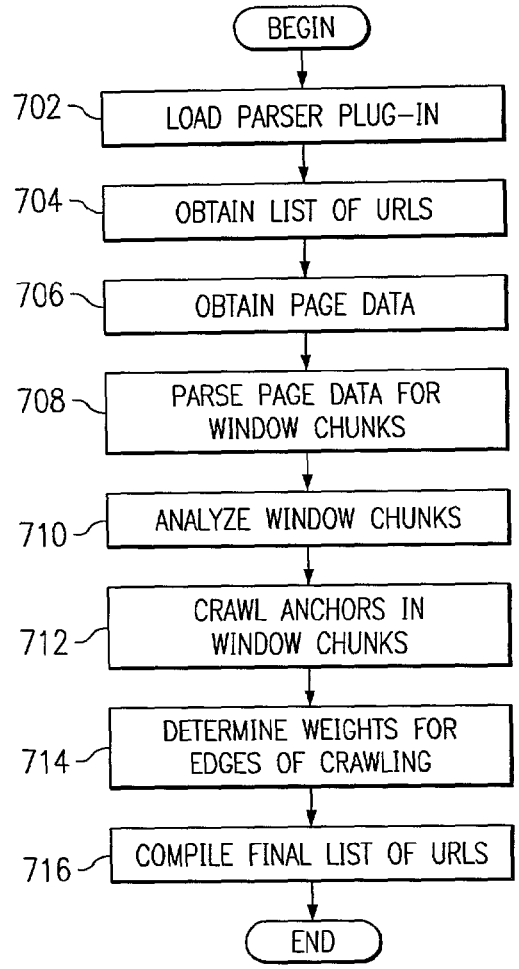
FIG. 7 is a flowchart illustrating the operation of a crawling search engine in accordance with a preferred embodiment of the present invention.

Turning now to FIG. 7, a flowchart illustrating the operation of a crawling search engine is depicted in accordance with a preferred embodiment of the present invention. The process begins and loads a parser plug-in (step 702). Then, the process obtains a list of URLs (step 704), obtains page data (step 706), and parses the page data for window chunks (step 708) using the plug-in parser loaded in step 702.

Thereafter, the process analyzes the window chunks (step 710) and recursively crawls anchors in the window chunks (step 712). Next, the process determines weights for the edges of the crawling (step 714), compiles a final list of URLs (step 716) and ends.

Thus, the present invention solves the disadvantages of the prior art by providing a plug-in interface to a crawling search engine. The present invention also provides plug-in parsers for use with the search engine. The plug-in interface allows the search engine to be configured with different plug-in parsers. Therefore, a customer may configure a search engine with a parser that best suits the needs of the customer and to try new parsing algorithms to find the best results.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a recordable-type media for configuring a search engine, the method comprising:

providing a plug-in interface for a crawling search engine; and providing a plurality of different plug-in parsers for use with the crawling search engine, wherein the plug-in interface allows the crawling search engine to be configured with different plug-in parsers, wherein the plurality of different plug-in parsers parse page data for window chunks using different parsing algorithms.

2. The method of claim 1, wherein the crawling search engine recursively crawls anchors in the window chunks.

3. The method of claim 2, wherein the crawling search engine determines edges of the recursive crawling and determines weights for page data of the edges.

4. The method of claim 3, wherein the crawling search engine compile s a final results list based on the weights.

5. The method of claim 1, wherein each plug-in parser of the plurality of different plug-in parsers includes a weighting algorithm.

6. A method in a recordable-type media for searching documents, the method comprising:

loading a plug-in parser by a crawling search engine from a plurality of different plug-in parsers for use with the crawling search engine via a plug-in interface for the crawling search engine, wherein the plurality of different plug-in parsers parses page data for window chunks using different parsing algorithms;

obtaining a list of pages;

obtaining page data for the pages;

using the plug-in parser to parse the page data for a set of window chunks; and recursively crawling anchors in the set of window chunks.

7. The method of claim 6, wherein the step of recursively crawling anchors comprises:

determining edges of the recursive crawling; and determining weights for page data of the edges.

8. The method of claim 7, further comprising:

compiling a results list based on the weights.

9. The method of claim 6, wherein the plug-in parser is a first plug-in parser, the list of pages is a first list of pages, the page data is first page data, and the set of window chunks is a first set of window chunks, the method further comprising:

loading a second plug-in parser;

obtaining a second list of pages; obtaining second page data for the second list of pages;

using the second plug-in parser to parse the second page data for a second set of window chunks; and recursively crawling anchors in the second set of window chunks.

10. An apparatus for searching documents, comprising:
- a crawling search engine, wherein the crawling search engine includes a plug-in interface that allows the crawling search engine to be configured with different plug-in parsers;
- a memory that contains a set of instructions;
- a plurality of different plug-in parsers for use with the crawling search engine, wherein the plurality of different plug-in parsers parse page data for window chunks using different parsing algorithms; and
- a processing unit, responsive to execution of the set of instructions, loading from the crawling search engine one of the the plurality of different plug-in parsers via the plug-in interface and parsing with the loaded plug-in parser page data for window chunks.

11. The apparatus of claim 10, wherein the crawling search engine recursively crawls anchors in the window chunks.

12. The apparatus of claim 11, wherein the crawling search engine determines edges of the recursive crawling and determines weights for page data of the edges.

13. The apparatus of claim 12, wherein the crawling search engine compiles a final results list based on the weights.

14. The apparatus of claim 10, wherein each plug-in parser of the at least one plug-in parser includes a weighting algorithm.

15. A recordable-type medium stored thereon computer usable program code for configuring a search engine, the computer usable program code, when executed by a computer, causes the computer to perform:
- providing a plug-in interface for a crawling search engine; and
- providing a plurality of different plug-in parsers for use with the crawling search engine,
- wherein the plug-in interface allows the crawling search engine to be configured with different plug-in parsers,
- wherein the plurality of different plug-in parsers parse page data for window chunks using different parsing algorithms.

16. The recordable-type medium of claim 15, wherein the crawling search engine includes instructions for recursively crawling anchors in the window chunks.

17. A recordable-type medium stored thereon computer usable program code for searching documents, the computer usable program code, when executed by a computer, causes the computer to perform:
- loading a plug-in parser by a crawling search engine from a plurality of different plug-in parsers for use with the crawling search engine via a plug-in interface for the crawling search engine, wherein the plurality of different plug-in parsers parse page data for window chunks using different parsing algorithms;
- obtaining a list of pages;
- obtaining page data for the pages;
- using the plug-in parser to parse the page data for window chunks; and
- recursively crawling anchors in the window chunks.

18. A method in a recordable-type media for configuring a search engine, the method comprising:
- providing a plug-in interface for a crawling search engine;
- providing a plurality of different plug-in parsers for use with the crawling search engine;
- wherein the plug-in interface allows the crawling search engine to be configured with different plug-in parsers,
- wherein the plurality of different plug-in parsers parse page data for window chunks using different parsing algorithms;
- wherein the crawling search engine loads one of the plurality of different plug-in parsers via the plug-in interface;
- wherein the loaded plug-in parser performs the step of parsing the page data before the crawling search engine performs other actions relative to the page data.

* * * * *